US009222566B2

(12) United States Patent
Lee et al.

(10) Patent No.: US 9,222,566 B2
(45) Date of Patent: Dec. 29, 2015

(54) AUTO-LOCKING TORQUE DISTRIBUTING MECHANISM

(71) Applicants: Kuo-Ming Lee, Kaohsiung (TW); Yu-An Hsieh, Kaohsiung (TW)

(72) Inventors: Kuo-Ming Lee, Kaohsiung (TW); Yu-An Hsieh, Kaohsiung (TW)

( * ) Notice: Subject to any disclaimer, the term of this patent is extended or adjusted under 35 U.S.C. 154(b) by 275 days.

(21) Appl. No.: 13/948,289

(22) Filed: Jul. 23, 2013

(65) Prior Publication Data
US 2014/0102252 A1    Apr. 17, 2014

(30) Foreign Application Priority Data

Oct. 12, 2012    (TW) .............................. 101137725 A

(51) Int. Cl.
*F16H 48/24*    (2006.01)
*F16H 57/04*    (2010.01)
*F16H 48/26*    (2006.01)

(52) U.S. Cl.
CPC ................ *F16H 48/24* (2013.01); *F16H 48/26* (2013.01); *F16H 57/042* (2013.01); *F16H 57/043* (2013.01); *F16H 57/0421* (2013.01); *F16H 57/0428* (2013.01); *F16H 57/0483* (2013.01); *F16H 57/0493* (2013.01); *F16H 57/0495* (2013.01); *F16H 2048/265* (2013.01); *Y10T 74/19074* (2015.01)

(58) Field of Classification Search
CPC ... F16H 48/24; F16H 48/26; F16H 2048/265; F16H 48/08; F16H 48/18; F16H 48/20; F16H 57/042; F16H 57/0421–57/0428; F16H 57/0493; F16H 57/0495; F16H 57/0483
USPC ........... 74/650, 665 GB, 665 T, 731.1, 732.1; 475/249, 250, 150
See application file for complete search history.

(56) References Cited

U.S. PATENT DOCUMENTS

| | | | | |
|---|---|---|---|---|
| 3,237,483 A | * | 3/1966 | Kelley et al. ................... | 475/226 |
| 3,292,456 A | * | 12/1966 | Saari ............................... | 475/226 |
| 5,106,347 A | * | 4/1992 | Takemura et al. .............. | 475/90 |
| 5,127,887 A | * | 7/1992 | Nuttall .............................. | 475/2 |
| 5,839,985 A | * | 11/1998 | Teraoka .......................... | 475/90 |
| 5,881,849 A | * | 3/1999 | Gassmann ..................... | 188/294 |
| 6,412,589 B1 | * | 7/2002 | Barlage et al. ................. | 180/377 |
| 6,491,126 B1 | * | 12/2002 | Robison et al. ................ | 180/233 |
| 8,070,641 B2 | * | 12/2011 | McVea et al. .................. | 475/249 |
| 8,858,385 B2 | * | 10/2014 | Forrest et al. .................. | 475/231 |
| 2007/0292068 A1 | * | 12/2007 | Mayne ........................... | 384/544 |

FOREIGN PATENT DOCUMENTS

GB            2451887 A    *    2/2009  .............. F16H 1/455

* cited by examiner

*Primary Examiner* — William Kelleher
*Assistant Examiner* — Bobby Rushing, Jr.
(74) *Attorney, Agent, or Firm* — Rosenberg, Klein & Lee

(57) ABSTRACT

An auto-locking torque distributing mechanism comprises a main plate receiving two gear sets. On two sides of the main plate, slots and apertures are respectively formed near two side peripheries thereof and partially communicated with each other. A sleeve assembly includes a covering unit with an opening enclosed by a first wall whereby each aperture is communicated with the opening and arranged near the first wall while connecting the main plate to the sleeve assembly. When one wheel slips and spins much faster than the other wheel, the sleeve assembly keeps fluid to avoid leaking. By the aforementioned partial communication, the fluid is easily sucked into the aperture to enter the slot and go among the gear sets, thereby limiting the amount of torque sent to the slipping wheel and distributing as much as torque to the non-slipping wheel to keep the traction of the vehicle.

13 Claims, 10 Drawing Sheets

AUTO-LOCKING TORQUE DISTRIBUTING MECHANISM

BACKGROUND OF THE INVENTION

1. Field of the Invention

The present invention relates to a torque distributing structure, particularly to an auto-locking torque distributing mechanism.

2. Description of the Related Art

When one of the wheels on the same axle slips, for instance on icy roads, more torque is sent to the wheel that spins uselessly. If that slipping wheel completely loses its traction, all powers are sent to that wheel and a forward momentum is inevitably lost. From a performance standpoint, when a vehicle is cornering or turning and the wheel on the inside of the turn lifts off and begins to slip under the power, a large amount of the power imparted to the slipping wheel causes the wheel to spin more without gripping. Even though the wheel on the outside of the turn which is on the ground requires more traction, the outside wheel does not receive so many powers since most powers are wasted on the spinning inside wheel. Accordingly, a kind of torque distributing mechanism, such as limited slip differentials (LSDs), comes in new designs with mechanical configurations, like a hydraulic or an electronic mechanism, and supplies the power to the wheels that grip instead of the wheels that slip. A conventional Taiwan Utility Model No. M404139 owned by the subject applicants is a limited slip differential which includes a main plate cooperating with a transmission device and two meshing differential gears. The main plate forms two communicating rooms for receiving the differential gears, and the differential gears are engaged with the transmission device which connects vehicle axles, whereby the transmission device drives the rotations of the differential gears. However, in practical, when one wheel slips and spins faster than the other one, the fluid (e.g. engine or machine oil) between the differential gears would be easily drained out of the through-holes, which causes the insufficient fluid capacity in the product and fails to distribute the torque to the two axles evenly. The limited slip effect is restricted.

Due to the insufficient limited effect of the convention design, the inventors submit the subject invention under consideration in light of their abundant research experiences.

SUMMARY OF THE INVENTION

An objective of the present invention is to provide an auto-locking torque distributing mechanism benefiting to restrict the slipping wheel spinning to a minimum by preventing the slipping wheel from spinning incessantly and distribute the torque to the non-slipping wheel to maintain the traction of the vehicle's momentum efficiently.

A further object of the present invention is to provide an auto-locking torque distributing mechanism which attains an active flowing design to supplement and circulate the fluid within the mechanism, thereby promoting the speed limitation effect and preventing the slipping wheel from spinning incessantly.

A further object of the present invention is to provide an auto-locking torque distributing mechanism which simplifies the installation of the configuration and increases the convenience of installation and use.

The auto-locking torque distributing mechanism in accordance with the present invention mainly comprises a main plate, two meshing gear sets disposed on the main plate, a backing plate disposed at one side of the main plate, a transmission assembly connected to two side axles of a vehicle, and a sleeve assembly disposed at the other side of the main plate. The main plate includes a body and a blocking wall recessed into the body, and two sides of the body respectively form slots and apertures which are formed adjacent to the opposite peripheries of the body and partially communicated with each other. The sleeve assembly includes a covering unit and a connecting portion extending outward from the covering unit. A first wall of the covering unit forms an opening, and the connecting portion includes an extension section connected to a second wall of the covering unit and inserted into an interior of the covering unit, whereby each aperture is communicated with the opening and located adjacent to the first wall when the sleeve assembly is connected to the main plate. Accordingly, when one of the wheels slips and spins to exceed a predetermined rotational speed, the cooperation of the main plate and the sleeve assembly keeps fluid in the sleeve assembly efficiently to prevent the leakage. By means of the partial communication between the slots and apertures, the fluid is easily sucked into the apertures to go among the two gear sets via the slots, thereby maintaining sufficient fluid capacity between the gear sets, creating a huge back pressure to limit the slipping wheel spinning to a minimum by preventing it from spinning incessantly and distributing the torque to the non-slipping wheel to maintain the traction of the vehicle.

Preferably, through-holes are formed on the extension section of the connecting portion, and each aperture is located with respect to the through holes by different horizontal levels while connecting the sleeve assembly to the main plate. Holes are respectively formed on the body of the main plate, each transmission assembly, and the backing plate.

Preferably, each gear set includes a main gear received in each room of the main plate, a transmission gear meshing with the main gear, and an idle gear pivoting on the transmission gear. The transmission gear and the idle gear are respectively connected to the transmission assemblies.

Preferably, each transmission assembly is arranged by interior teeth for meshing with each gear set.

Preferably, the aperture is formed into a semicircular shape.

Preferably, the main plate and the backing plate further include a first engaging portion and a second engaging portion protruding outward therefrom in different directions respectively. The two engaging portions are hollowly formed to allow the two axles to insert and position thereto. The main plate forms a first entrance penetrating between a bottom of the first engaging portion and the bottom wall, and the backing plate forms a second entrance penetrating from a bottom of the second engaging portion to the other side of the backing plate. The first entrance and the second entrance are located by different horizontal levels and disposed toward the main rooms. The two axles are pivotably connected to a fitting unit which is positioned to the mechanism, and the fitting unit is attached to a fluid power device. Furthermore, each of the axles can have an annular groove concavely formed on a periphery thereof, a first passage formed from a groove surface of the annular groove to an interior of each axle, and a second passage connecting the first passage and extending into each engaging portion. The fitting unit further forms a fitting slot relative to the annular groove, whereby the fluid power device is connected to the fitting slot of the fitting unit via a pipe.

Preferably, the main plate includes a protruding section projecting from an outer periphery of the body, and the backing plate forms a combining section which fits into the protruding section of the main plate.

Preferably, a housing is connected to the sleeve assembly from which the housing extends to surround and position the main plate and the backing plate.

The advantages of the present invention over the prior arts will become more apparent by reading following descriptions in conjunction with the corresponding drawings.

DETAILED DESCRIPTION OF THE PREFERRED EMBODIMENTS

Figure 1:
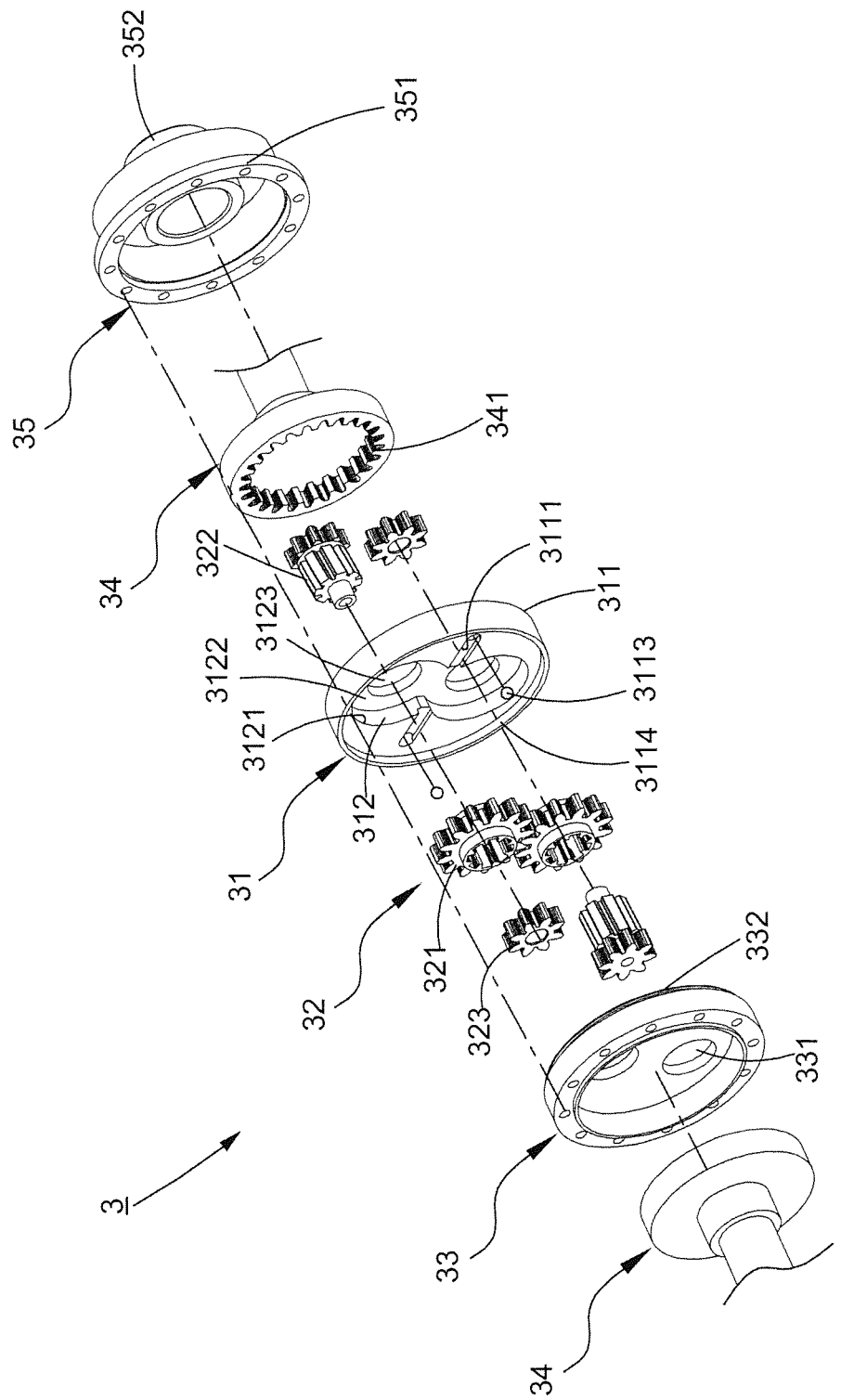
FIG. 1 is a perspective view showing a first preferred embodiment of the present invention.

Before describing in details, it should note the like elements are denoted by similar reference numerals throughout the disclosure.

Figure 2:
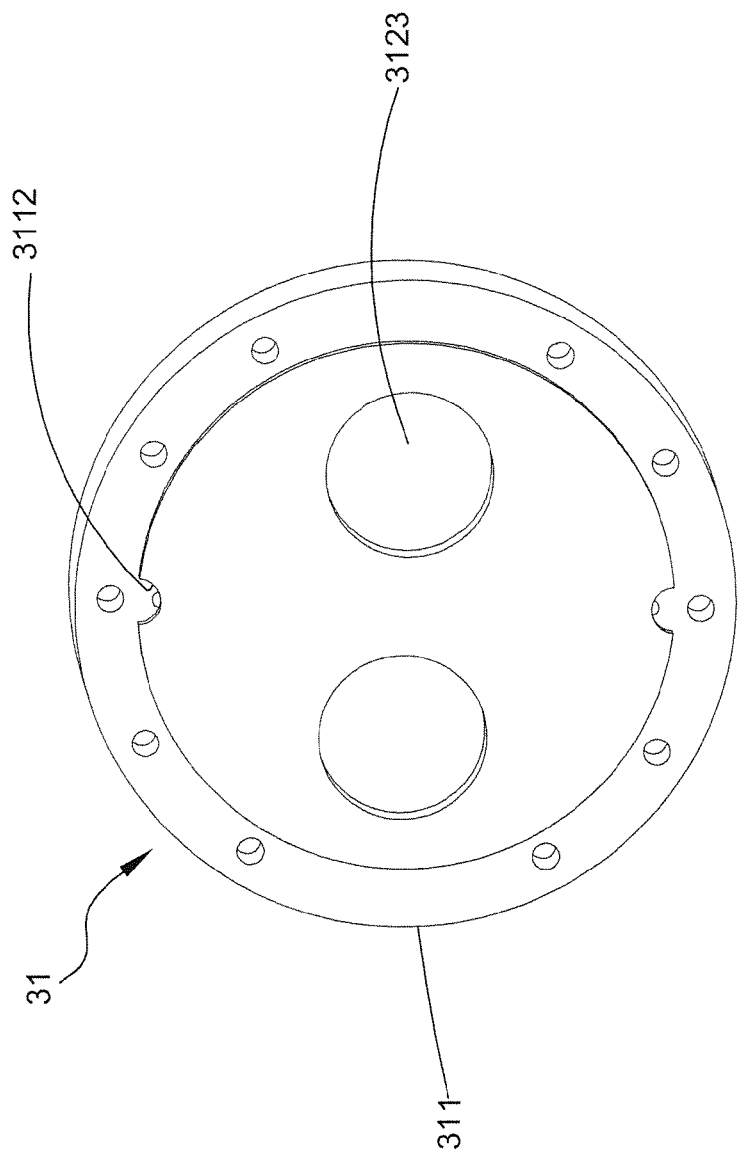
FIG. 2 is a partial schematic view showing the other side of the main plate of the first preferred embodiment.

Referring to FIG. 1 and FIG. 2 shows an auto-locking torque distributing mechanism 3 of the first preferred embodiment comprising a main plate 31, two gear sets 32 disposed in the main plate 31, a backing plate 33 disposed at one side of the main plate 31, two transmission assemblies 34 engaging with the gear sets 32, and a sleeve assembly 35 disposed at the other side of the main plate 31 for covering one of the transmission assemblies 34. Wherein, the main plate 31 is driven by a power source of a vehicle (not shown). The main plate 31 includes a body 311 and a blocking wall 312 recessed into the body 311. The body 311 has diametrically opposed slots 3111 formed in one side of the body and apertures 3112 respectively formed through the two sides of the body 311 and each being in communication with a respective slot and a limiting unit 3113 disposed inside each slot 3111 and located relative to each aperture 3112. In this embodiment, the main plate 31 can provide a protruding section 3114 projecting from an outer periphery of the body 311.

Further, each slot 3111 is disposed to extend from a place adjacent to a periphery of the body 311 toward the blocking wall 312, so the slot 311 is lengthways extended as illustrated. Each aperture 3112 is disposed adjacent to the periphery at the other side of the body 311 and communicated with the slot 3111 partially. To promote the fluid sucking effect of the main plate 31, the shape of each aperture 3112 is not limited. The aperture 3112 can be a semicircle, an ellipse, or other adequate shapes, and the semicircular shape is herein adopted. The limiting unit 3113 can be a steel ball or other elements to restrict the flowing direction of the fluid. the blocking wall 312 forms two rooms 3121 which are communicated with each other and connected to the slots 3111. The blocking wall 312 connects a bottom wall 3122 on which two first caves 3123 are respectively defined to communicate with the rooms 3121.

Figure 4:
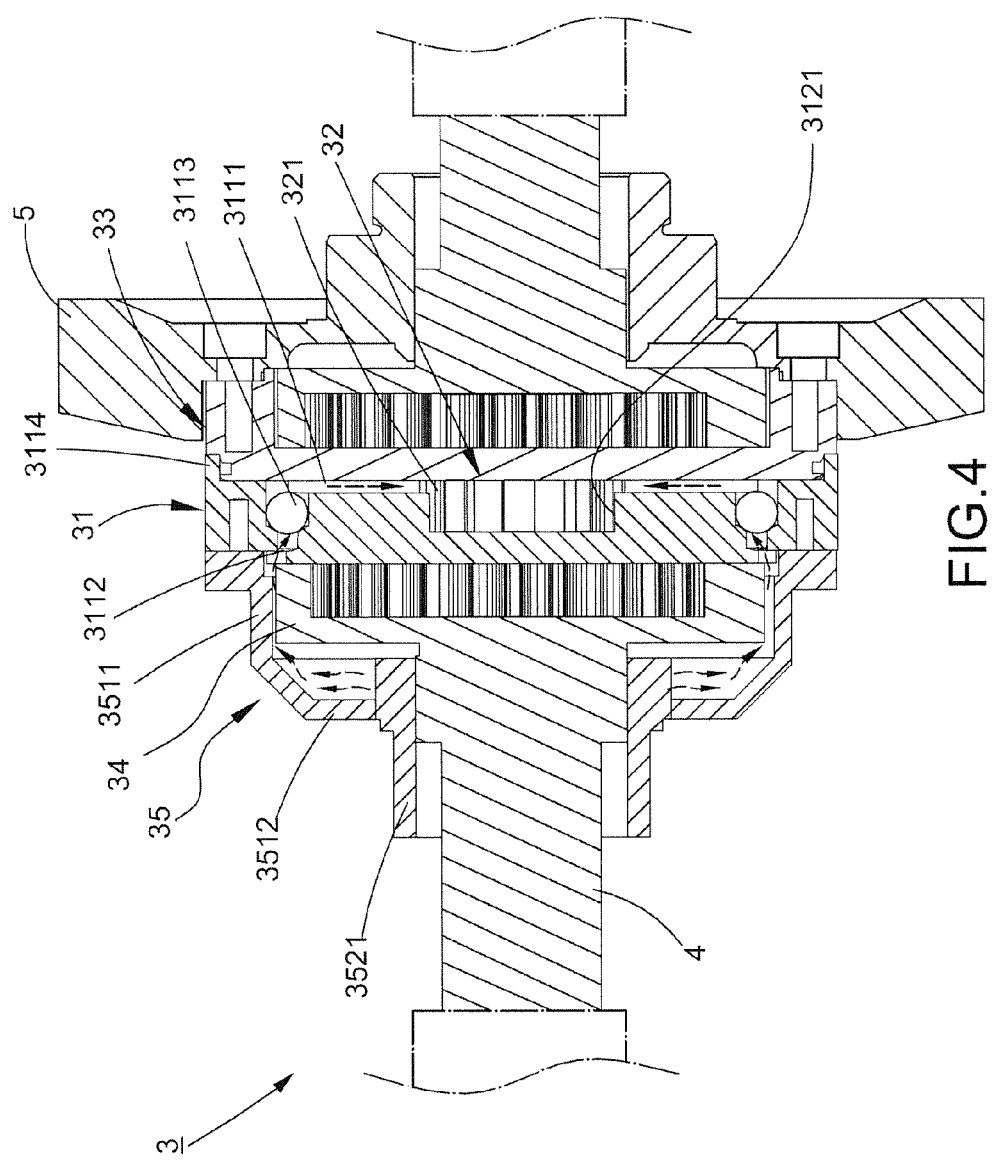
FIG. 4 is a schematic view showing an operation of the first preferred embodiment.

The backing plate 33 includes second caves 331 corresponding to the first caves 3123 for allowing the gear sets 32 to penetrate therethrough. The backing plate 33 further forms a combining section 332 which fits into the protruding section 3114 to attain a convenient and firm connection between the main plate 31 and the backing plate 33 and prevent the fluid leakage efficiently. The two gear sets 32 are located in the rooms 3121 for meshing with each other. Preferably, each gear set 32 includes a main gear 321 received in each room 3121, a transmission gear 322 engaged with the main gear 321, and an idle gear 323 pivoting on the transmission gear 322. The transmission gear 322 and the idle gear 323 are respectively connected to the transmission assemblies 34. As shown in FIG. 4, the transmission assemblies 34 are respectively connected to two side axles 4 of the vehicle. Preferably, each transmission assembly 34 is arranged by interior teeth 341 for meshing with each gear set 32, namely meshing with each transmission gear 322 and idle gear 323 as illustrated, whereby the transmission assemblies 34, the axles 4, and the gear sets 32 are mutually driven.

Figure 3:
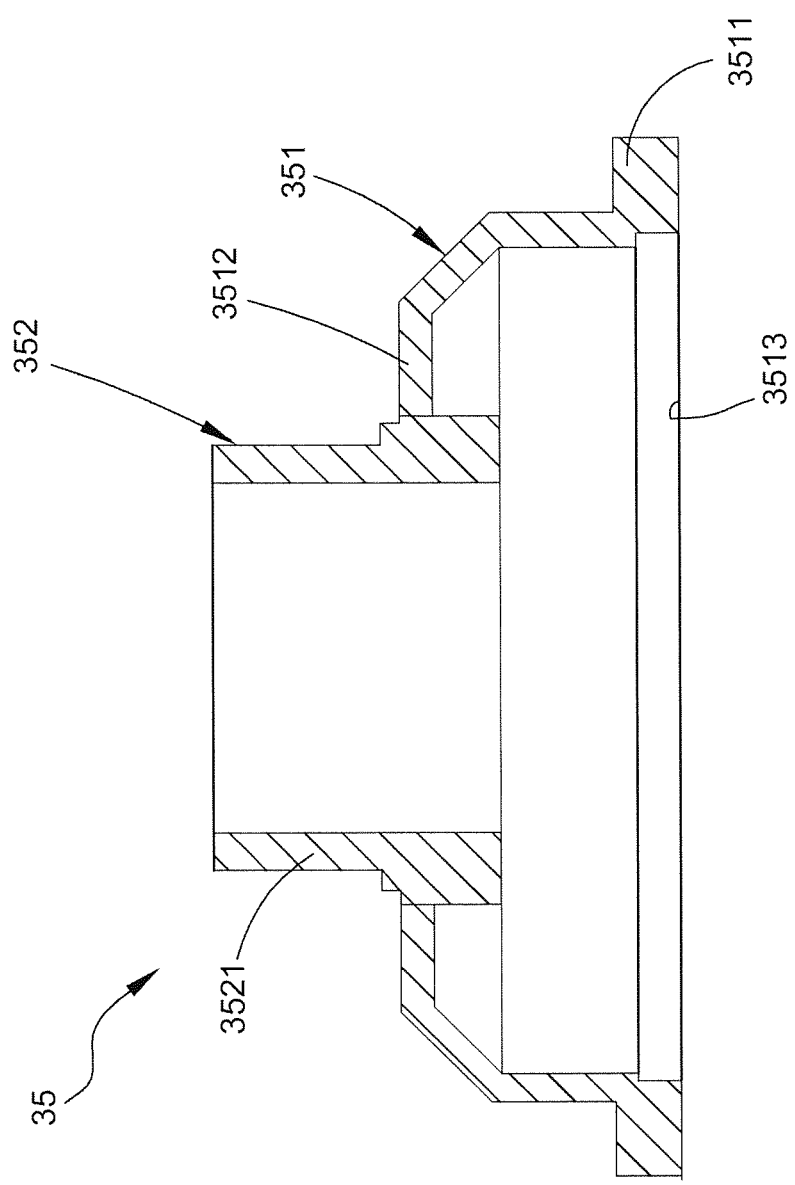
FIG. 3 is a partial schematic view showing the sleeve assembly of the first preferred embodiment.

Also referring to FIG. 3, the sleeve assembly 35 includes a covering unit 351 enclosed by a first wall 3511 and a second wall 3512 and a connecting portion 352 extending outward from the covering unit 351. An opening 3513 is enclosed by the first wall 3511 of the covering unit 351. The connecting portion 352 further includes an extension section 3521 which is connected to the second wall 3512 of the covering unit 351 and inserted into an interior of the covering unit 351. Accordingly, when the sleeve assembly 35 is connected to the main plate 31, each aperture 3112 is communicated with the opening 3513 and located adjacent to or near the first wall 3511.

Referring to FIG. 1, FIG. 3, and FIG. 4, the present mechanism 3 is mounted onto a vehicle, more particularly a bevel gear 5 of the vehicle as briefly illustrated. Fluid, e.g. engine or machine oil, is kept inside the sleeve assembly 35. A power source of the vehicle (not shown) is activated to synchronize the rotations of the main plate 31, the backing plate 33, and the sleeve assembly 35. When one wheel slips or soars to spin on a slippery surface or due to other reasons, such as high-speed turns, the difference of rotational speed between the two axles 4 exceeds a threshold or a predetermined rotational speed. In addition, with the centrifugal force comes from the cornering, the fluid within the sleeve assembly 35 tends to flow between the connecting portion 352 and the covering unit 351, namely a space enclosed by the extension section 3521 and the first and second walls 3511, 3512, whereby the fluid is efficiently limited within the space as arrowed to prevent the leakage.

When the fluid is kept in the sleeve assembly 35, the semi-circular apertures 3112 adjacent to the first walls 3511 can suck the fluid easily, and the partial communication between the apertures 3112 and the slots 3111 as well as the limiting units 3113 can assist the fluid in traveling through the slots 3111 and entering the rooms 3121, thereby keeping a certain capacity of fluid among the main gears 321, transmission gears 322, and idle gears 323. The combination of the protruding section 3114 and the combining section 332 can also prevent the fluid from leaking out of the main plate 31. In this manner, the rooms 3121 are in a low pressure situation or becomes analogous to a vacuum state to allow a volume of fluid input to transiently exceed a predetermined volume of fluid release. In other words, the fluid is continuously introduced into the apertures 3112 and the slots 3111 for entering the rooms 3121, which renders the fluid unable to be immediately drained out of the interstice between the main gears 321, and a huge back pressure is promptly produced among the gears to block the pass of the fluid through the interstice, restrict the rotations of the main gears 321 and the transmission assemblies 34, and then limit the rotating direction of the correlated axle 4 which spins. Therefore, more torque is not sent to the slipping wheel that spins, and the slipping of the axle 4 is thence limited to a minimum to prevent the slipping wheel from spinning incessantly, which allows more torque to be distributed or transferred to the non-slipping wheel to maintain the traction of the vehicle.

Figure 5:
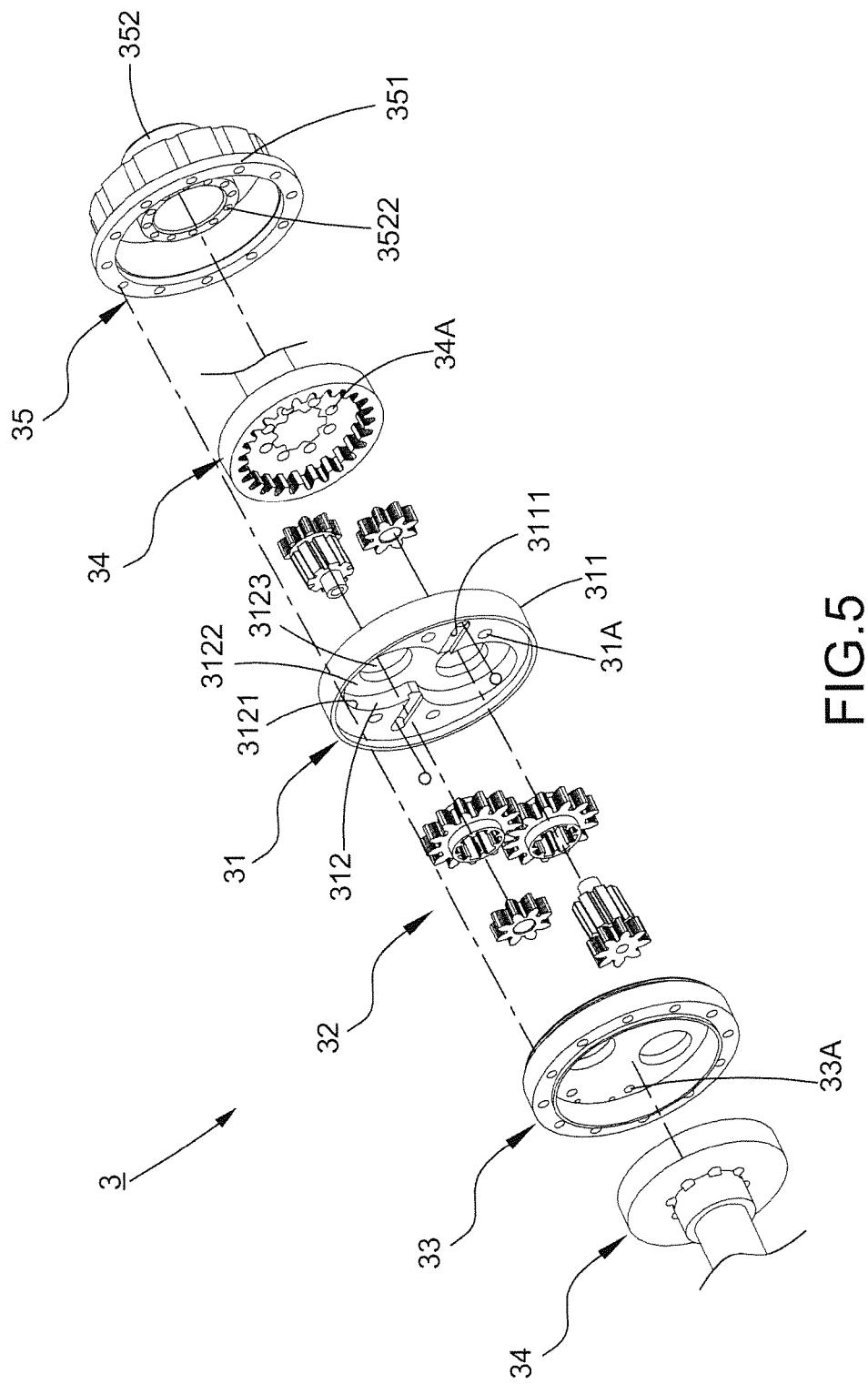
FIG. 5 is a perspective view showing a second preferred embodiment of the present invention.
Figure 6:
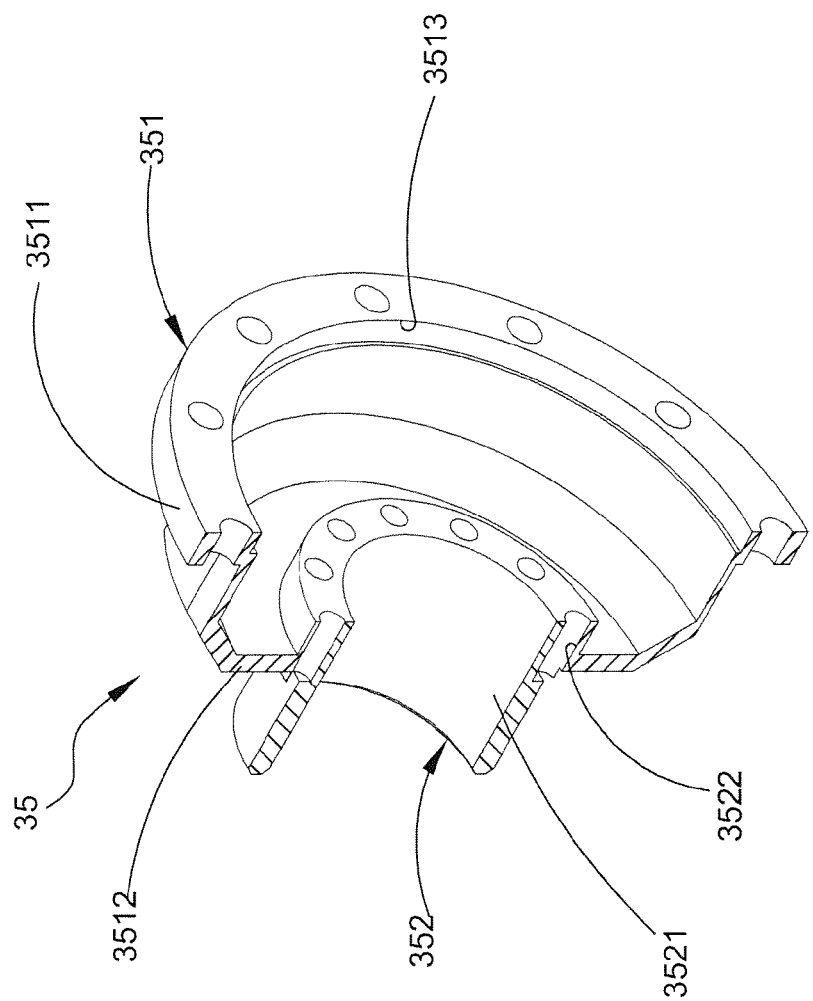
FIG. 6 is a partial schematic view showing the sleeve assembly of the second preferred embodiment.
Figure 7:
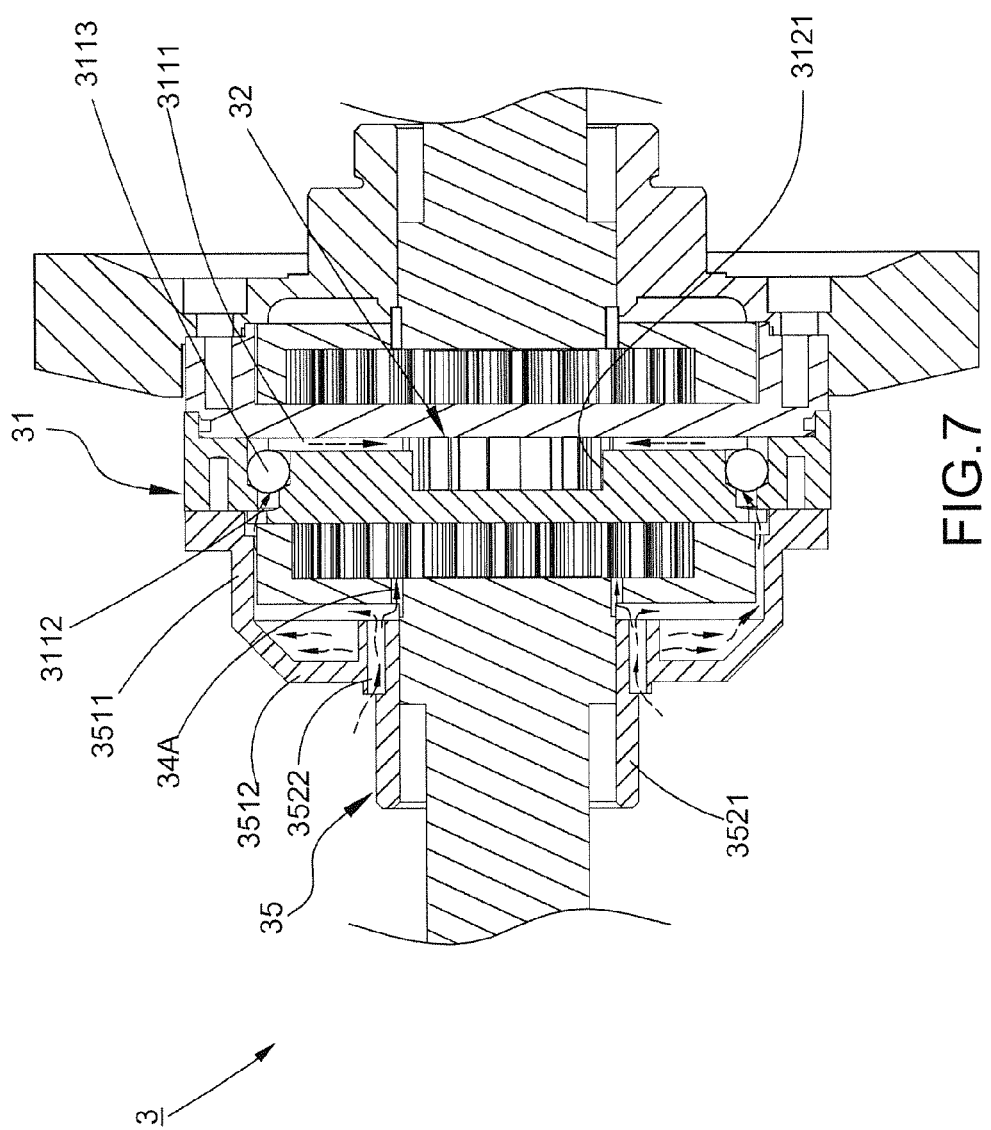
FIG. 7 is a schematic view showing an operation of the second preferred embodiment.

Referring to FIG. 5 and FIG. 6 shows an auto-locking torque distributing mechanism 3 of the second preferred embodiment comprising the same elements as the first embodiment for the same stated objectives and purposes. In particular, this preferred embodiment includes a plurality of through-holes 3522 formed on the extension section 3521 of the sleeve assembly 35, whereby each aperture 3112 is located with respect to the through-holes 3522 by different horizontal levels (as shown in FIG. 7) when the sleeve assembly 35 is connected to the main plate 31. Further, the body 311 of the main plate 31, each transmission assembly 34, and the backing plate 33 form respective holes 31A, 34A, 33A, thereon, which allow the fluid to circulate within the mechanism 3. Therefore, if part of fluid still leaks to the outside, outer supplemented fluid can be introduced through the through-holes 3522 to allow the fluid to pass the holes 34A directly and enter the interstice between the gear sets 32. By the apertures 3112 and the through-holes 3522 located by different horizontal levels, the fluid is kept within the sleeve assembly 35 to prevent the leakage. The design of the apertures 3112 sucks the fluid easily and leads it to the slots 3111 and the rooms 3121, and the holes 31A, 34A, 33A facilitate the circulation of fluid inside the mechanism 3. Therefore, certain capacity of fluid can be included among the interstice between the gear sets 32 to limit the amount of torque sent to the spinning wheel and distribute as much as torque to the non-slipping wheel to keep the traction of the vehicle.

Figure 8:
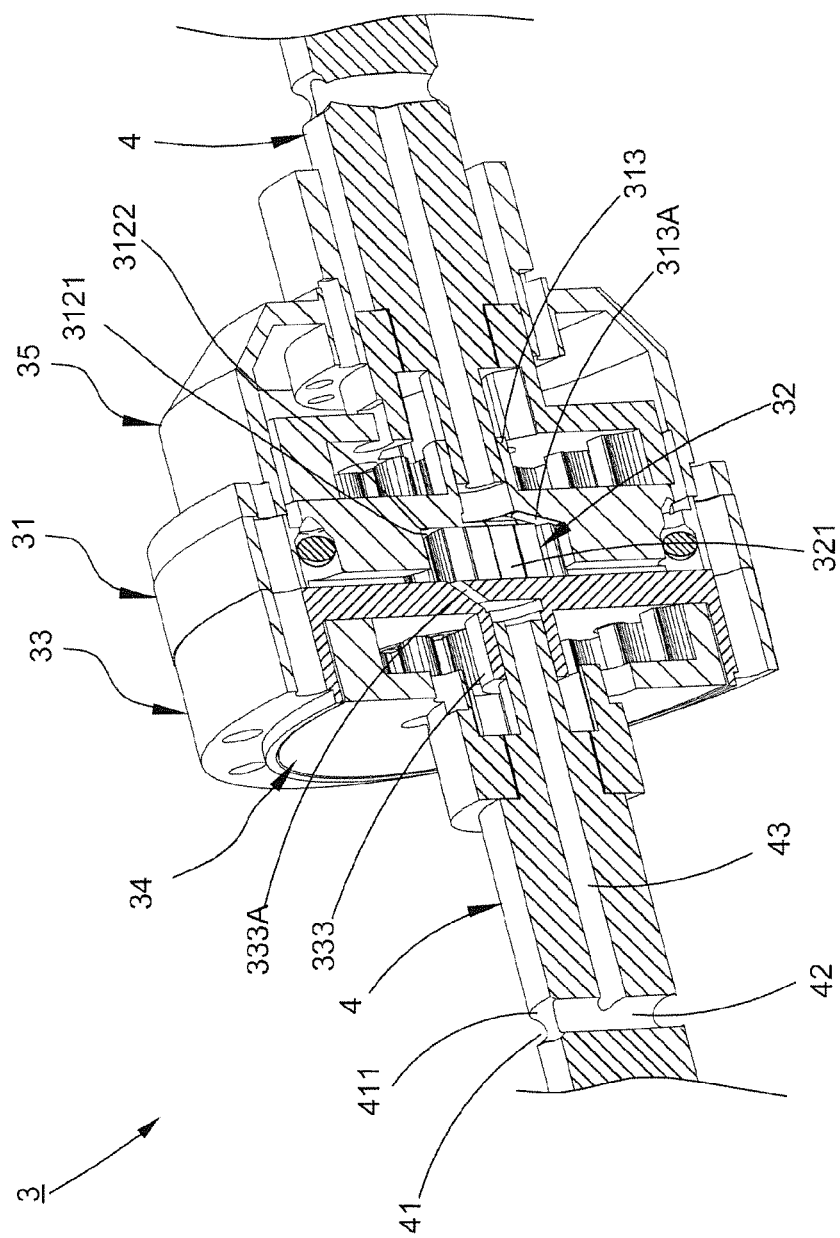
FIG. 8 is a perspective view showing a third preferred embodiment of the present invention.

Referring to FIG. 8 shows an auto-locking torque distributing mechanism 3 of the third preferred embodiment comprising the same elements as the second embodiment. In particular, the main plate 31 and the backing plate 33 further include a first engaging portion 313 and a second engaging portion 333 protruding outward therefrom in different directions, respectively. The first engaging portion 313 and the second engaging portion 333 are hollowly formed to allow the two side axles 4 to insert and position thereto. Further, the main plate 31 forms a first entrance 313A penetrating between a bottom of the first engaging portion 313 and the bottom wall 3122, and the backing plate 33 forms a second entrance 333A penetrating from a bottom of the second engaging portion 333 to the other side of the backing plate 33. The first entrance 313A and the second entrance 333A are located with respect to different horizontal levels and disposed toward the main rooms 3121, whereby these two entrances can face an interstice between the gear sets 32, preferably the interstice between the main gears 321 as adopted in this embodiment. Further referring to FIG. 9, the axles 4 are pivotably connected to a fitting unit 6 which is positioned to the mechanism 3, and the fitting unit 6 is connected to a fluid power device 7. Each axle 4 has an annular groove 41 concavely formed on a periphery thereof, a first passage 42 formed from a groove surface 411 of the annular groove 41 to an interior of each axle 4, and a second passage 43 connected to the first passage 42 for extending into each engaging portion 313,333. Alternatively, the first passage 42 can be directly formed to extend into each engaging portion 313,333 (not shown). The fitting unit 6 further forms a fitting slot 61 disposed relative to the annular groove 41, whereby the fluid can enter the annular groove 41 and the passages 42, 43 via the fitting slot 61 freely. Moreover, the fluid power device 7, which can be a pump (briefly shown) or other apparatus, is connected to the fitting slot 61 of the fitting unit 6 via a pipe 7, thereby performing an active flowing design to supplement and circulate the fluid within the mechanism 3.

Figure 9:
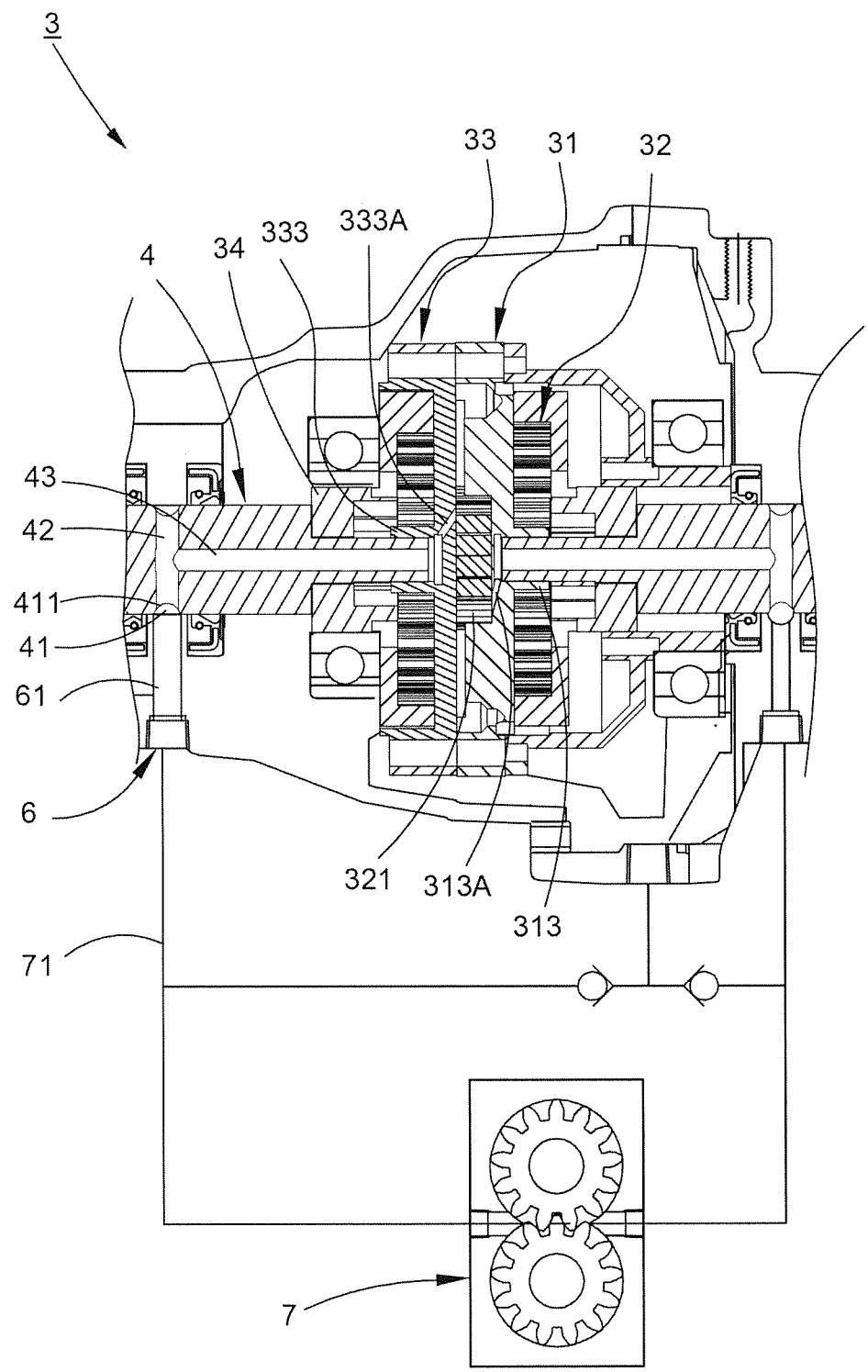
FIG. 9 is a schematic view showing an operation of the third preferred embodiment.

Referring to FIG. 9, the two axles 4 are firstly connected to the transmission assemblies 34 and firmly inserted into the first and the second engaging portions 313,333. The fluid power device 7, e.g. a pump with gear wheels, injects and supplements the fluid into the mechanism 3, and the fluid enters the first and the second passages 42, 43 by passing through the pipe 71, the fitting slot 61, and the annular groove 41. When the vehicle is cornering or turning without slipping, the fluid travels through the second entrance 333A to flow through the interstice between the meshing gear sets 32, namely between the main gears 321. Under the meshing rotation of the main gears 321, the fluid is led to the first passage 313A for feeding the passages 42, 43 of the axle 4 at the other side and returning to the fluid power device 7. Therefore, the circulation of fluid in the mechanism 3 is attained, which not only prevents the fluid from leaking but allows the gear sets 32 to mesh rotatively with each other by different rotation speeds in order to promote the speed limitation effect. When the vehicle slips, the fluid power device 7 increases the pressure to pump the fluid to the gear sets 32 quickly, which causes the volume of fluid input to transiently exceed the predetermined volume of fluid release and renders the fluid unable to be immediately drained out of the interstice between the main gears 321. The generation of the back pressure is enhanced to restrict the rotations of the gear sets 32 and the axles 4. Therefore, the continuous spinning of the slipping wheel is limited, and more torque is distributed to the non-slipping wheel to maintain the traction of the vehicle.

Figure 10:
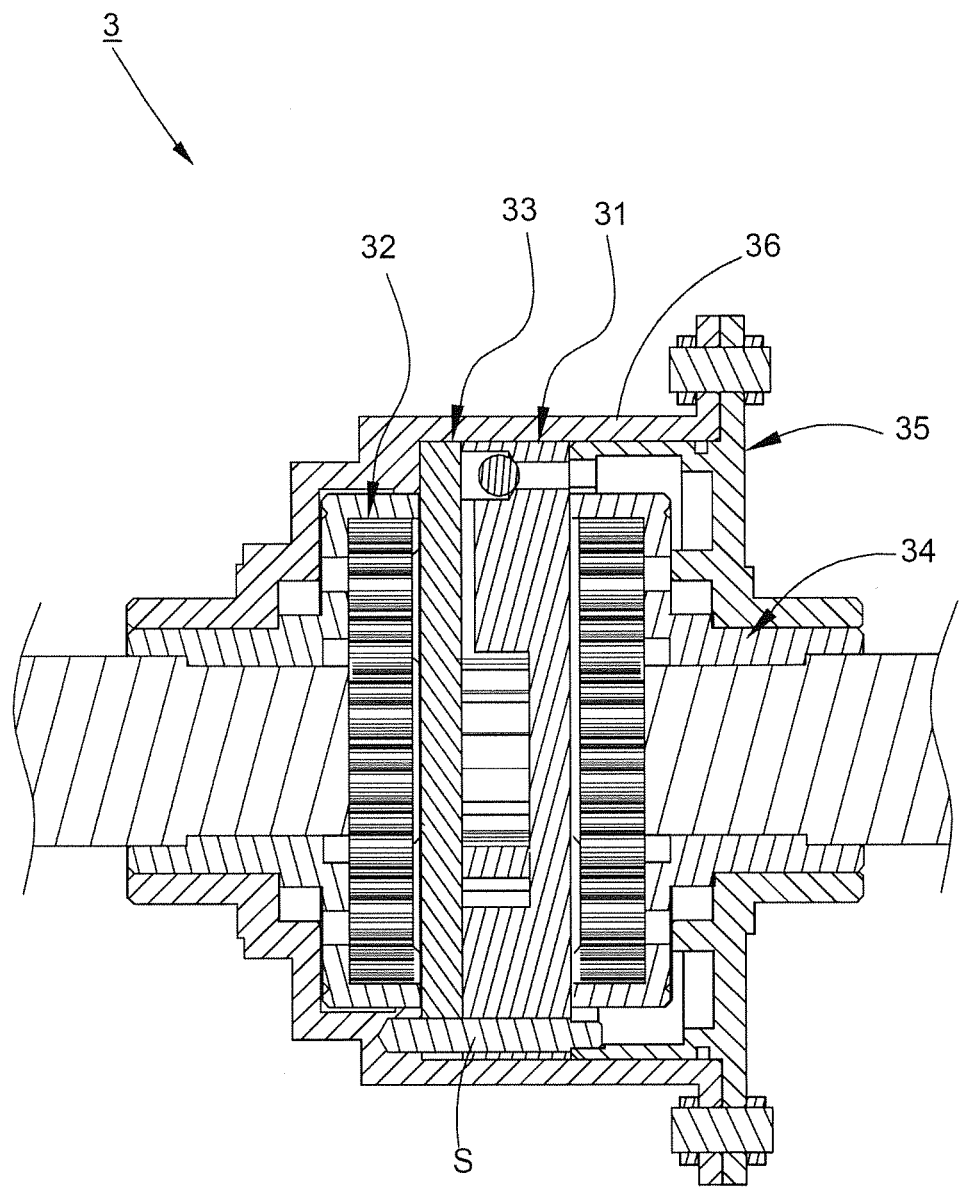
FIG. 10 is a perspective view showing a fourth preferred embodiment of the present invention.

Referring to FIG. 10 shows an auto-locking torque distributing mechanism 3 of the fourth preferred embodiment which comprises a main plate 31, gear sets 32, a backing plate 33, transmission assemblies 34, and a sleeve assembly 35. In particular, a housing 36 is connected to the sleeve assembly 35 from which the housing 36 can extend to surround and position the main plate 31 and the backing plate 32. An example explaining in more detail is shown in the figure and executed by using a fastener S to connect the main plate 31 and the backing plate 32 and allowing the fastener S to combine with the housing 36. The housing 36 and the sleeve assembly 35 are then fixed mutually to simplify the installation of the configuration and promote the convenience of installation and use. This embodiment also provides the same operation and objectives as the previous embodiments, which are herein omitted.

To sum up, the present invention takes advantage of the cooperation of the main plate and the sleeve assembly to keep the fluid within the sleeve assembly efficiently and prevent the leakage. The partial communication between the slots and apertures allow the fluid to be easily sucked by the apertures for feeding the slots and the two gear sets, thereby limiting the spinning of the slipping wheel to a minimum and distributing as much as torque to the non-slipping wheel efficiently to maintain the traction of the vehicle.

While we have shown and described the embodiment in accordance with the present invention, it should be clear to those skilled in the art that further embodiments may be made without departing from the scope of the present invention.

We claim:

1. An auto-locking torque distributing mechanism comprising:

a main plate driven by a power source of a vehicle; said main plate including a body and a blocking wall recessed into said body, wherein said body having a pair of diametrically opposed slots formed in one side of said body, a pair of apertures formed through two sides of said body and being in communication with a respective one of said pair of slots and a limiting unit disposed inside each slot and located relative to a corresponding aperture; each slot being disposed to extend from a place adjacent to a periphery of said body toward said blocking wall, and each aperture being disposed adjacent to said periphery at the other side of said body; said blocking wall forming two communicated rooms which are connected to said slots and connecting a bottom wall on which two first caves are respectively defined to communicate with said rooms;

two gear sets disposed in said rooms for meshing with each other;

a backing plate disposed at one side of said main plate, said backing plate including second caves corresponding to said first caves and allowing said gear sets to penetrate therethrough;

two respective transmission assemblies connected to said gear sets, said transmission assemblies being connected to two side axles of said vehicle, whereby said transmission assemblies, said axles, and said gear sets are driven mutually; and a sleeve assembly disposed at the other side of said main plate to cover one of said transmission assemblies, wherein said sleeve assembly including a covering unit enclosed by a first wall and a second wall and a connecting portion extending outward from said covering unit, an opening being enclosed by said first wall of said covering unit, said connecting portion including an extension section connected to said second wall of said covering unit and inserted into an interior of said covering unit, each aperture being communicated with said opening and located near said first wall.

2. The auto-locking torque distributing mechanism according to claim 1, wherein a plurality of through-holes are formed on said extension section of said connecting portion, each aperture being located with respect to said through holes by different horizontal levels while connecting said sleeve assembly to said main plate, a plurality of holes being formed on said body of said main plate, each transmission assembly, and said backing plate respectively.

3. The auto-locking torque distributing mechanism according to claim 1, wherein each gear set includes a main gear received in each room, a transmission gear meshing with said main gear, and an idle gear pivoting on said transmission gear, said transmission gear and said idle gear being respectively connected to said transmission assemblies.

4. The auto-locking torque distributing mechanism according to claim 2, wherein each gear set includes a main gear received in each room, a transmission gear meshing with said main gear, and an idle gear pivoting on said transmission gear, said transmission gear and said idle gear being respectively connected to said transmission assemblies.

5. The auto-locking torque distributing mechanism according to claim 1, wherein each transmission assembly is arranged by interior teeth for meshing with each gear set.

6. The auto-locking torque distributing mechanism according to claim 2, wherein each transmission assembly is arranged by interior teeth for meshing with each gear set.

7. The auto-locking torque distributing mechanism according to claim 1, wherein said aperture is formed into a semicircular shape.

8. The auto-locking torque distributing mechanism according to claim 2, wherein said aperture is formed into a semicircular shape.

9. The auto-locking torque distributing mechanism according to claim 1, wherein said main plate and said backing plate further include a first engaging portion and a second engaging portion protruding outward therefrom in different directions respectively, said two engaging portions being hollowly formed to allow said two axles to insert and position thereto, said main plate forming a first entrance penetrating between a bottom of said first engaging portion and said bottom wall, said backing plate forming a second entrance penetrating from a bottom of said second engaging portion to the other side of said backing plate, said first entrance and said second entrance being located by different horizontal levels and disposed toward said main rooms, said two axles being pivotably connected to a fitting unit which is positioned to said mechanism, and said fitting unit being attached to a fluid power device.

10. The auto-locking torque distributing mechanism according to claim 9, wherein each of said axles has an annular groove concavely formed on a periphery thereof, a first passage formed from a groove surface of said annular groove to an interior of each axle, and a second passage connecting said first passage and extending into each engaging portion, said fitting unit further forming a fitting slot relative to said annular groove, whereby said fluid power device is connected to said fitting slot of said fitting unit via a pipe.

11. The auto-locking torque distributing mechanism according to claim 1, wherein said main plate includes a protruding section projecting from an outer periphery of said body, and said backing plate forms a combining section which fits into said protruding section of said main plate.

12. The auto-locking torque distributing mechanism according to claim 2, wherein said main plate includes a protruding section projecting from an outer periphery of said body, and said backing plate forms a combining section which fits into said protruding section of said main plate.

13. The auto-locking torque distributing mechanism according to claim 1, wherein a housing is connected to said sleeve assembly from which said housing extends to surround and position said main plate and said backing plate.

* * * * *